US012075201B2

(12) United States Patent
Michelogiannakis et al.

(10) Patent No.: US 12,075,201 B2
(45) Date of Patent: Aug. 27, 2024

(54) METHODS, SYSTEMS, AND DEVICES FOR BANDWIDTH STEERING USING PHOTONIC DEVICES

(71) Applicant: The Regents of the University of California, Oakland, CA (US)

(72) Inventors: Georgios Michelogiannakis, Berkeley, CA (US); Yiwen Shen, New York, NY (US); Min Yee Teh, New York, NY (US); John Shalf, Oakland, CA (US); Madeleine Glick, New York, NY (US); Keren Bergman, New York, NY (US)

(73) Assignee: The Regents of the University of California, Oakland, CA (US)

( * ) Notice: Subject to any disclaimer, the term of this patent is extended or adjusted under 35 U.S.C. 154(b) by 57 days.

(21) Appl. No.: 17/775,820

(22) PCT Filed: Nov. 13, 2020

(86) PCT No.: PCT/US2020/060510
§ 371 (c)(1),
(2) Date: May 10, 2022

(87) PCT Pub. No.: WO2021/097283
PCT Pub. Date: May 20, 2021

(65) Prior Publication Data
US 2022/0394362 A1 Dec. 8, 2022

Related U.S. Application Data

(60) Provisional application No. 62/935,944, filed on Nov. 15, 2019.

(51) Int. Cl.
*H04Q 11/00* (2006.01)
*H04L 41/12* (2022.01)

(52) U.S. Cl.
CPC ........ *H04Q 11/0062* (2013.01); *H04L 41/12* (2013.01); *H04Q 11/0005* (2013.01);
(Continued)

(58) Field of Classification Search
CPC ........... H04Q 11/0005; H04Q 11/0062; H04Q 2011/0052; H04Q 2011/0073; H04Q 2011/0086; H04L 41/12
(Continued)

(56) References Cited

U.S. PATENT DOCUMENTS 8,107,458 B1 * 1/2012 Ranganathan ........ H04L 45/306
370/254
9,204,207 B2 * 12/2015 deRuijter et al. .... H04Q 3/0083
(Continued)

OTHER PUBLICATIONS

Adda et al., "Routing and Fault Tolerance in Z-Fat Tree", IEEE Transactions on Parallel and Distributed Systems, vol. 28, No. 8, Aug. 2017.
(Continued)

*Primary Examiner* — Dalzid E Singh
(74) *Attorney, Agent, or Firm* — Womble Bond Dickinson (US) LLP

(57) ABSTRACT

Disclosed herein are methods, systems, and devices for bandwidth steering. Systems may include a plurality of compute nodes configured to execute one or more applications, a plurality of first level resources communicatively coupled to the plurality of compute nodes, a plurality of second level resources communicatively coupled to the plurality of first level resources, and a plurality of third level resources communicatively coupled to the plurality of second level resources. Systems may also include a plurality of optical switch circuits communicatively coupled to the plurality of first level resources and the plurality of second level resources, wherein each of the plurality of optical switch circuits is coupled to more than one of the plurality of the
(Continued)

first level resources and is also coupled to more than one of the plurality of the second level resources.

18 Claims, 5 Drawing Sheets

(52) U.S. Cl.
CPC ............. *H04Q 2011/0052* (2013.01); *H04Q 2011/0073* (2013.01); *H04Q 2011/0086* (2013.01)

(58) Field of Classification Search
USPC .......................................................... 398/45
See application file for complete search history.

(56) References Cited

U.S. PATENT DOCUMENTS

| | | | | |
|---|---|---|---|---|
| 9,491,526 | B1* | 11/2016 | Zhao | H04Q 11/0062 |
| 10,237,192 | B2* | 3/2019 | Kakadia | H04L 43/12 |
| 2010/0268755 | A1 | 10/2010 | Arimilli et al. | |
| 2012/0008945 | A1* | 1/2012 | Singla | H04J 14/0204 |
| | | | | 398/45 |
| 2014/0177447 | A1* | 6/2014 | Venkataswami | H04L 47/29 |
| | | | | 370/252 |
| 2015/0289035 | A1* | 10/2015 | Mehrvar | H04Q 11/0066 |
| | | | | 398/51 |
| 2016/0239749 | A1 | 8/2016 | Peredriy et al. | |
| 2017/0094378 | A1* | 3/2017 | Kiaei | H04Q 11/0062 |
| 2017/0366881 | A1* | 12/2017 | Kuo | H04Q 11/0005 |
| 2018/0024932 | A1* | 1/2018 | Nachimuthu | G06F 3/0688 |
| | | | | 711/213 |
| 2018/0067887 | A1* | 3/2018 | Krishnan | H04L 12/64 |
| 2018/0089127 | A1* | 3/2018 | Flajslik | G06F 13/4022 |
| 2019/0149896 | A1* | 5/2019 | Grammel | H04J 14/0272 |
| | | | | 398/3 |
| 2019/0260658 | A1 | 8/2019 | Gell et al. | |

OTHER PUBLICATIONS

Ahn et al., "HyperX: Topology, Routing, and Packaging of Efficient Large-Scale Networks", In Proceedings of the Conference on High Performance Computing Networking, Storage and Analysis (SC '09). Article 41, 11 pages.
Al-Fares et al., "A Scalable, Commodity Data Center Network Architecture", In Proceedings of the ACM SIGCOMM 2008 Conference on Data Communication (SIGCOMM '08). ACM, 63-74.
Camarero et al., "Random Folded Clos Topologies for Datacenter Networks", 2017 IEEE International Symposium on High Performance Computer Architecture (HPCA). 193-204.
Camarero et al., "On Random Wiring in Practicable Folded Clos Networks for Modern Datacenters", IEEE Transactions on Parallel and Distributed Systems, vol. 29, No. 8, Aug. 2018.
Chatzieleftheriou et al., "Larry: Practical Network Reconfigurability in the Data Center", Proceedings of the 15th USENIX Symposium on Networked Systems Design and Implementation (NSDI '18). Apr. 9-11, 2018 • Renton, WA, USA.
Cheng et al., "Ultralow-crosstalk, strictly non-blocking microring-based optical switch", Photonics Research vol. 7 155, No. 2 155.
Cheng et al., "Recent advances in optical technologies for data centers: a review", Optica, vol. 5, No. 11 / Nov. 2018 / 1354.
Clos, "A Study of Non-Blocking Switching Networks", The Bell System Technical Journal 32, 2 (Mar. 1953), 406-424.
Georgiou et al., "Evaluating Scalability and Efficiency of the Resourceand Job Management System on Large HPC Clusters", In Job Scheduling Strategies for Parallel Processing, Walfredo Cirne, Narayan Desai, Eitan Frachtenberg, and Uwe Schwiegelshohn (Eds.). Springer Berlin Heidelberg, Berlin, Heidelberg, 134-156.
Greenberg et al., "A Scalable and Flexible Data Center Network", SIGCOMM Comput. Commun. Rev. 39, 4 (Aug. 2009), 51-62.
Harsh et al., "Expander Datacenters: From Theory to Practice", CoRR abs/1811.00212 (2018). arXiv:1811.00212.
Hoefler et al., "Multistage Switches are not Crossbars: Effects of Static Routing in High-Performance Networks", In 2008 IEEE International Conference on Cluster Computing. 116-125.
Jiang et al., "HyperX: A Scalable Hypergraph Framework", IEEE Transactions on Knowledge and Data Engineering, vol. 31, No. 5, May 2019.
Lee, "Photonic switching platform for datacenters enabling rapid network reconfiguration", Proc. SPIE 10560, Metro and Data Center Optical Networks and Short-Reach Links, 105600C (Jan. 30, 2018).
Michelogiannakis et al., "Bandwidth Steering in HPC Using Silicon Nanophotonics", SC '19, Nov. 17-22, 2019, Denver, CO, USA.
Mollah et al., "A Comparative Study of Topology Design Approaches for HPC Interconnects", 2018 18th IEEE/ACM International Symposium on Cluster, Cloud and Grid Computing.
Nikhil Jain et al., "Predicting the Performance Impact of Dilerent Fat-Tree Configurations".
Redaelli et al., "Task Scheduling with Configuration Prefetching and Anti-Fragmentation techniques on Dynamically Reconfigurable Systems", Proceedings of the Conference on Design, Automation and Test in Europe (Date '08). 519-522.
Sasikala et al., "All optical switching and associated technologies: a review", Journal of Optics 47, 3 (Sep. 1, 2018), 307-317.
Scott et al., "The BlackWidow High-Radix Clos Network", In 33rd International Symposium on Computer Architecture (ISCA'06). 16-28.
Shen et al., "Autonomous Dynamic Bandwidth Steering with Silicon Photonic-BasedWavelength and Spatial Switching for Datacom Networks", 2018 Optical Fiber Communications Conference and Exposition (OFC). 1-3.
Shen et al., "Silicon photonic-enabled bandwidth steering for resource-efficient high performance computing", Proceedings vol. 10946, Metro and Data Center Optical Networks and Short-Reach Links II (SPIE), vol. 10946.
Singh et al., "Jupiter Rising: A Decade of Clos Topologies and Centralized Control in Google's Datacenter Network", DOI: http://dx.doi.org/10.1145/2785956.2787508.
Yang et al., "Cooperative Batch Scheduling for HPC Systems", 2016.
International Search Report and Written Opinion mailed on Feb. 9, 2021 for International Application No. PCT/US2020/060510.

\* cited by examiner

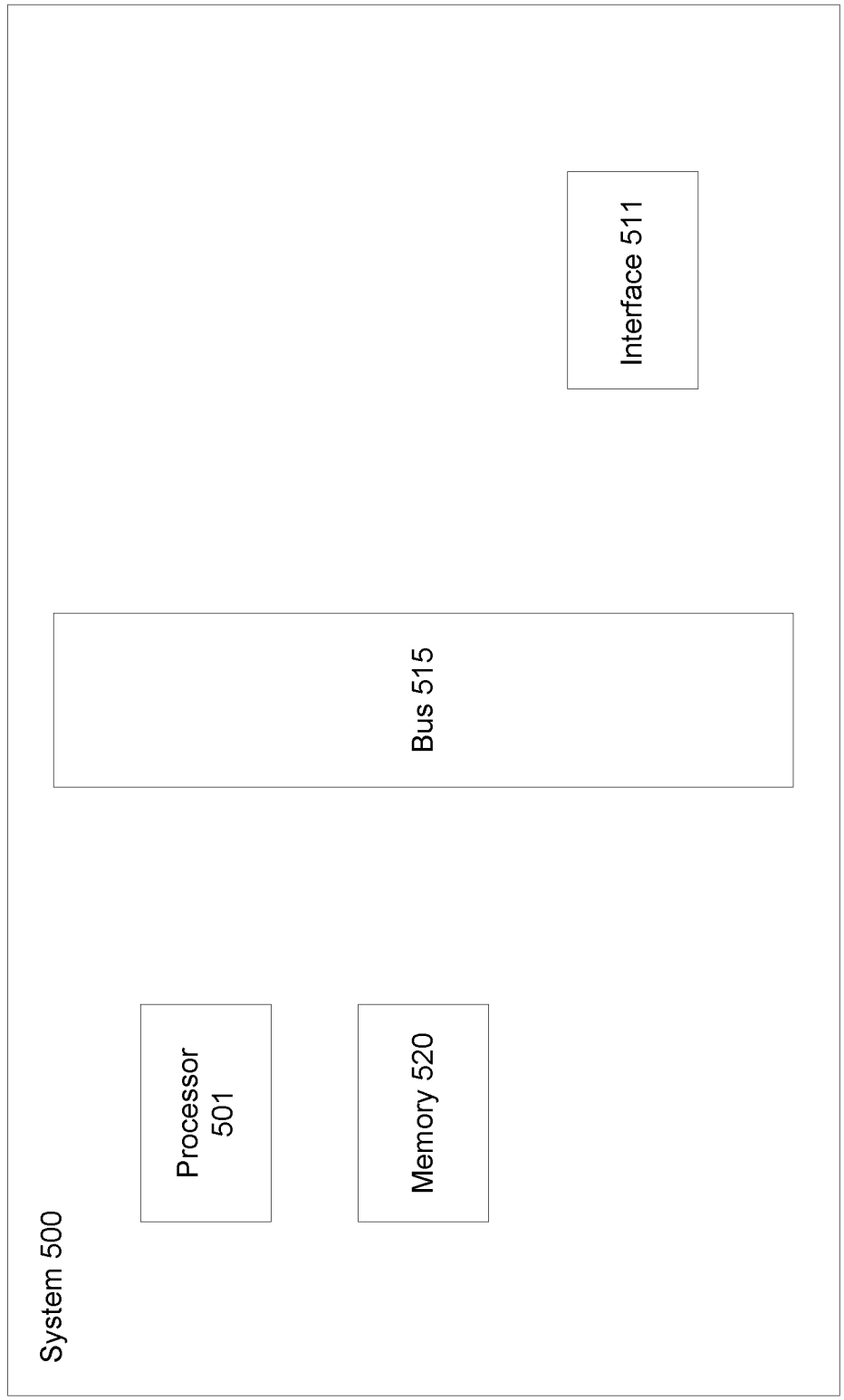

METHODS, SYSTEMS, AND DEVICES FOR BANDWIDTH STEERING USING PHOTONIC DEVICES

CROSS-REFERENCE TO RELATED APPLICATIONS

This application claims the benefit under 35 U.S.C. § 119(e) of U.S. Provisional Patent Application No. 62/935,944, filed on Nov. 15, 2019, which is incorporated herein by reference in its entirety for all purposes.

STATEMENT OF GOVERNMENT SUPPORT

This invention was made with government support under Contract No. DE-AC02-05CH11231 awarded by the U.S. Department of Energy and under Award No. DE-AR0000843 awarded by the Advanced Research Projects Agency-Energy (ARPA-E), U.S. Department of Energy. The government has certain rights in this invention.

TECHNICAL FIELD

This disclosure relates generally to network topologies, and more particularly to bandwidth steering within a network topology using photonic devices.

BACKGROUND

Computing systems and computing environments may use interconnection networks to couple different components of such computing environments to each other, and thus enable communication and data transmission between such components. For example, in a computing environment such as a data center or a high performance computing system, various computing and network resources may be arranged in a hierarchy in which a network topology may be implemented on top of data center resources, such as racks and nodes. Accordingly, the network topology may be used to facilitate communication between different racks and nodes within the data center. Conventional computing systems and computing environments remain limited in their ability to direct data transmission traffic through the network topology in a manner that does not overburden different layers of the network topology while also being energy and performance efficient.

SUMMARY

Disclosed herein are methods, systems, and devices for bandwidth steering. Systems may include a plurality of compute nodes configured to execute one or more applications, a plurality of first level resources communicatively coupled to the plurality of compute nodes, a plurality of second level resources communicatively coupled to the plurality of first level resources, and a plurality of third level resources communicatively coupled to the plurality of second level resources. Systems may also include a plurality of optical switch circuits communicatively coupled to the plurality of first level resources and the plurality of second level resources, wherein each of the plurality of optical switch circuits is coupled to more than one of the plurality of the first level resources and is also coupled to more than one of the plurality of the second level resources.

In various embodiments, the plurality of first level resources includes a plurality of Top of Rack (ToR) switches, wherein the plurality of second level resources includes a plurality of aggregation switches, and wherein the plurality of third level resources includes a plurality of core switches. In various embodiments, the plurality of ToR switches and the plurality of aggregation switches is arranged in a plurality of pods. In some embodiments, each of the plurality of pods includes one of the plurality of optical switch circuits. According to various embodiments, each of the plurality of optical switch circuits is communicatively coupled to one of the plurality of first level resources included in each pod, and wherein each of the plurality of optical switch circuits is communicatively coupled to one of the plurality of second level resources included in each pod.

In various embodiments, the plurality of optical switch circuits are configurable to implement a designated path based on a specified network topology. In some embodiments, the specified network topology does not include any of the plurality of third level resources. According to various embodiments, the designated path is determined based, at least in part, on network traffic congestion. In various embodiments, the plurality of compute nodes, the plurality of first level resources, the plurality of second level resources, the plurality of third level resources, and the plurality of optical switch circuits are included in a data center.

Also disclosed herein are methods that include identifying a network traffic event, identifying a designated path associated with a specified network topology based, at least in part, on one or more compute nodes associated with the network traffic event, and configuring at least one optical switch circuit based, at least in part, on the identified network topology. In various embodiments, the network topology includes a plurality of first level resources communicatively coupled to the plurality of compute nodes, a plurality of second level resources communicatively coupled to the plurality of first level resources, and a plurality of third level resources communicatively coupled to the plurality of second level resources.

In various embodiments, the plurality of first level resources includes a plurality of Top of Rack (ToR) switches, wherein the plurality of second level resources includes a plurality of aggregation switches, wherein the plurality of third level resources includes a plurality of core switches, wherein the plurality of ToR switches and the plurality of aggregation switches is arranged in a plurality of pods, and wherein each of the plurality of pods includes one of the plurality of optical switch circuits. In some embodiments, each of the plurality of optical switch circuits is communicatively coupled to one of the plurality of first level resources included in each pod, and wherein each of the plurality of optical switch circuits is communicatively coupled to one of the plurality of second level resources included in each pod. According to various embodiments, the specified network topology does not include any of the plurality of third level resources. In various embodiments, the plurality of compute nodes, the plurality of first level resources, the plurality of second level resources, the plurality of third level resources, and the plurality of optical switch circuits are included in a data center. In some embodiments, the designated path is identified based, at least in part, buffer utilization of at least some of the plurality of first level resources, the plurality of second level resources, and the plurality of third level resources.

Further disclosed herein are devices that include an optical switch circuit, a first communications interface communicatively coupled to the optical switch circuit and a plurality of first level resources, and a second communications interface communicatively coupled to the optical switch circuit and a plurality of second level resources. In various embodiments, the plurality of first level resources is communicatively coupled to a plurality of compute nodes, wherein the plurality of second level resources is communicatively coupled to the plurality of first level resources and a plurality of third level resources. In some embodiments, the plurality of first level resources includes a plurality of Top of Rack (ToR) switches, wherein the plurality of second level resources includes a plurality of aggregation switches, wherein the plurality of third level resources includes a plurality of core switches. According to various embodiments, the plurality of ToR switches and the plurality of aggregation switches is arranged in a plurality of pods, wherein the optical switch circuit is communicatively coupled to one of the plurality of first level resources included in each pod, and wherein the optical switch circuit is communicatively coupled to one of the plurality of second level resources included in each pod, and wherein the optical switch circuit is configurable to implement a designated path based on a specified network topology.

Details of one or more embodiments of the subject matter described in this specification are set forth in the accompanying drawings and the description below. Other features, aspects, and advantages will become apparent from the description, the drawings, and the claims.

BRIEF DESCRIPTION OF THE DRAWINGS

FIG. 5 illustrates an example of a computing device configured in accordance with some embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Figure 1:
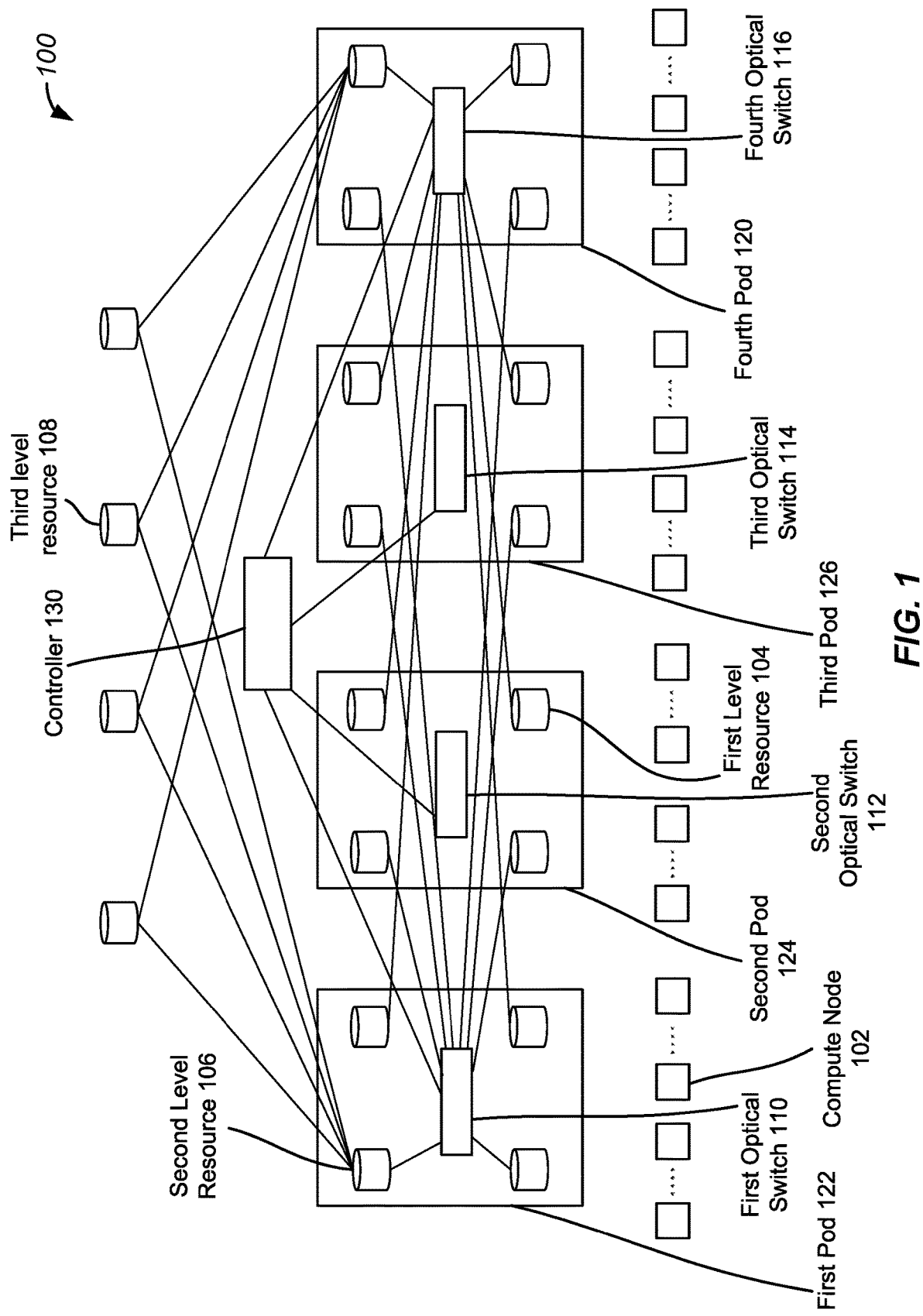
FIG. 1 illustrates an example of a system for bandwidth steering utilizing photonic devices, configured in accordance with some embodiments.

FIG. 1 illustrates an example of a system for bandwidth steering utilizing photonic devices, configured in accordance with some embodiments. As will be discussed in greater detail below, a system, such as system 100, may include various computing resources, and a communications network may be implemented to enable communication between the computing resources. As will also be discussed in greater detail below, the communications network includes photonic devices, such as optical switch circuits, that are configured to implement bandwidth steering in a manner that reduces utilization and overhead associated with resources of the communications network, and does so in a manner that uses less energy.

System 100 includes various computing resources, such as compute node 102. Accordingly, computing resources may be computing devices used to support the execution of software applications within a computing environment, such as a data center. Thus, according to various embodiments, system 100 includes various compute nodes arranged in racks of nodes. It will be appreciated that system 100 may include numerous computing nodes and/or computing resources, such as memory storage devices. For example, system 100 may include hundreds or thousands of computing nodes. Accordingly, the number of computing nodes included in a computing environment such as system 100 may be numerous, and may generate a commensurate amount of network traffic.

As shown in FIG. 1, a communications network may be implemented on top of the computing resources to facilitate communication between the computing resources and, for example, between compute nodes. In various embodiments, the communications network may have multiple levels. More specifically, the communications network may have a multi-tiered interconnect topology in which multiple levels of networking resources are utilized to handle communications traffic between compute nodes.

In various embodiments, the communications network has three levels of resources. Accordingly, system 100 may include a first level of resources, such as first level resource 104. In some embodiments, first level resource 104 is a top of rack (ToR) switch that is implemented on top of a rack of compute nodes. Accordingly, first level resource 104 may be communicatively coupled to a rack of compute nodes and may be configured as a network switch handling network traffic associated each of the compute nodes in the rack.

System 100 further includes a second level of resources, such as second level resource 106. In various embodiments, second level resources may be aggregation switches that are communicatively coupled to multiple first level resources, which may be ToR switches. Accordingly, the second level resources may be configured to handle communications between the first level resources and third level resources discussed in greater detail below.

System 100 additionally includes a third level of resources, such as third level resource 108. In various embodiments, third level resources are core switches that are communicatively coupled with the second level resources, and are also coupled to an additional communications network, such as a wide area network (WAN). In this way, the third level resources are configured to provide communicative coupling with other networks, and other entities coupled to such networks.

In various embodiments, level resources may be arranged into groups and sub-groups. For example, first level resources and second level resources may be arranged or grouped into pods, such as pod 120. In various embodiments, a relatively large amount of network traffic occurs within a pod and between adjacent racks of compute nodes. As shown in FIG. 1, pod 120 also includes an optical switch circuit, such as fourth optical circuit switch 116. Accordingly, as will be discussed in greater detail below, the optical switch circuit within a pod may enable the implementation of bandwidth steering such that network traffic within a pod is implemented without utilization of third level resources.

As shown in FIG. 1, the communications network may also include various photonic devices, also referred to herein as optical circuit switches. Accordingly, system 100 further includes first optical circuit switch 110, second optical circuit switch 112, third optical circuit switch 114, and fourth optical circuit switch 116. In various embodiments, each optical circuit switch may have a number of input ports and a number of output ports. The number of input and output ports may be any suitable number. Accordingly, an optical switch may have several input ports and output ports, or may have relatively few. In various embodiments, first optical circuit switch 110 is coupled to a first level resource and a second level resource via an optical coupler, such as an optical fiber. First optical circuit switch 110 is further coupled to adjacent first level resources and second level resources. As shown in FIG. 1, first optical circuit switch 110 is included in first pod 122, and is coupled to a first level resource and a second level resource of second pod 124, third pod 126, and fourth pod 120. In this way, first optical circuit switch 110 provides an additional level of coupling within the communications network, and as will be discussed in greater detail below, enables dynamic configurability of the network topology of system 100.

Communications network also includes second optical circuit switch 112 that is included in second pod 124, and is coupled to a first level resource and a second level resource of first pod 122, third pod 126, and fourth pod 120. Communications network further includes third optical circuit switch 114 that is included in third pod 126, and is coupled to a first level resource and a second level resource of first pod 122, second pod 124, and fourth pod 120. Communications network additionally includes fourth optical circuit switch 116 that is included in fourth pod 120, and is coupled to a first level resource and a second level resource of first pod 122, second pod 124, and third pod 126.

In some embodiments, the communications network has more than three levels. For example, the communications network may have five levels, and may have fourth level resources and fifth level resources. In this example, the communications network may have an additional layer of optical switch circuits implemented in a manner similar described above with reference to first optical circuit switch 110, second optical circuit switch 112, third optical circuit switch 114 and fourth optical circuit switch 116.

In various embodiments, system 100 further includes controller 130 which is configured to facilitate bandwidth steering, as will be discussed in greater detail below. Accordingly, controller 130 may be configured to be communicatively coupled to first optical circuit switch 110, second optical circuit switch 112, third optical circuit switch 114, and fourth optical circuit switch 116, and may be configured to control coupling implemented by such optical circuit switches, as well as the implementation of bandwidth steering parameters and algorithms described in greater detail below. Controller 130 may also include a memory device configured to store associated data objects and data values. In various embodiments, each of the optical circuit switches is configured to communicate with controller 130 via an interface, which may be a field-programmable gate array (FPGA) interface. In this way, a custom interface may be implemented between each of the optical circuit switches and controller 130.

It will be appreciated that the communications network may include various other implementations of coupling the optical switch circuits to first and second level resources. For example, an optical switch circuit may be coupled to every other pod if additional geographical separation or spread is desired, or if optical switch circuits with fewer ports are utilized for reduced cost and power consumption. In this way, variations in coupling between optical switch circuits and level resources may be implemented to accommodate different configurations of a data center, as well as different operational requirements and/or constraints.

Figure 2:
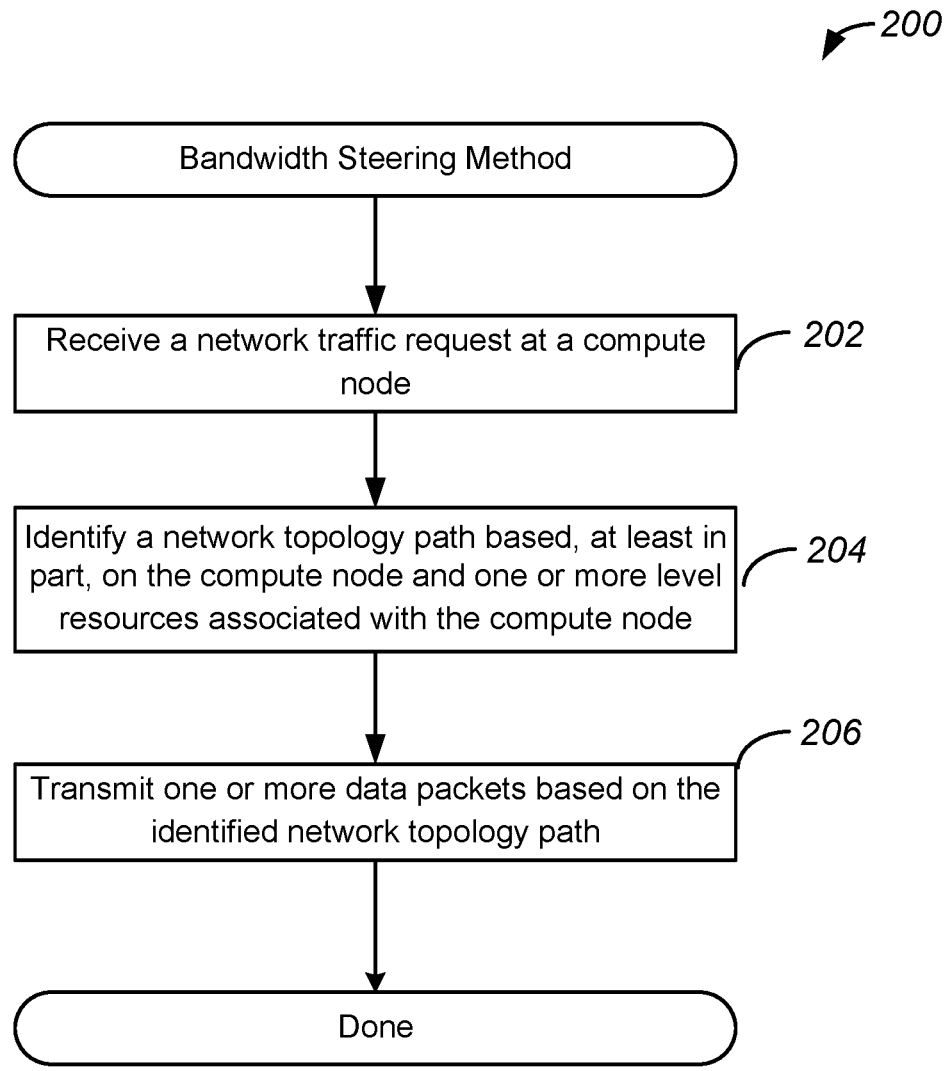
FIG. 2 illustrates a flow chart of an example of a method for bandwidth steering utilizing photonic devices, configured in accordance with some embodiments.

FIG. 2 illustrates a flow chart of an example of a method for bandwidth steering utilizing photonic devices, configured in accordance with some embodiments. As discussed above, components of a network topology of a communications network implemented in a computing environment may be configured to steer network traffic such that the utilization and overhead associated with higher level resources is reduced, and the efficiency of the usage of such higher level resources is increased. As will be discussed in greater detail below, for example with reference to method 200, optical circuit switches may be configured, and in some cases dynamically configured, to implement such changes in a network topology.

Accordingly, method 200 may commence with operation 202 during which a network traffic request may be received at a compute node. In various embodiments, the request may be a message received in response to one or more operations associated with an application associated with the compute node. For example, the compute node may be used to implement and execute the application, and the request may be generated in response to an initialization or operation undertaken by the application in which it requests or transmits data. As will be discussed in greater detail below, the request may also be received from another system component, such as a job scheduler.

Method 200 may proceed to operation 204 during which a network topology path may be identified based, at least in part, on the compute node and one or more level resources associated with the compute node. In various embodiments, the network topology path may be a previously stored topology path, may be learned, or may be recorded based on previous activity. Generation of the network topology path is discussed in greater detail below. In some embodiments, one or more optical switch circuits may be configured based on the identified network topology path. For example, one or more optical switch circuits may be configured to couple level resources in different pods to create the connectivity specified in the identified network topology path, and in a manner that does not utilize top level resources such as core switches. In some embodiments, the identified network topology is an optionally a steered path. More specifically, a steered preconfigured path may be selected, or alternatively may not be selected if ordinary operation is desired.

Method 200 may proceed to operation 206 during which one or more data packets may be transmitted based on the identified network topology path. Accordingly, a data packet may be transmitted from a first compute node to a second compute node via the identified network topology path and the optical switch circuit included in that identified network topology path. It will be appreciated that operation 206 may be implemented numerous times, and the identified network topology may be used for a designated period of time, and for example, a data transmission session. In this way, the implementation of the network topology discussed above may be implemented in response to larger scale events, such as the start of an application or the stop of an application.

Figure 3:
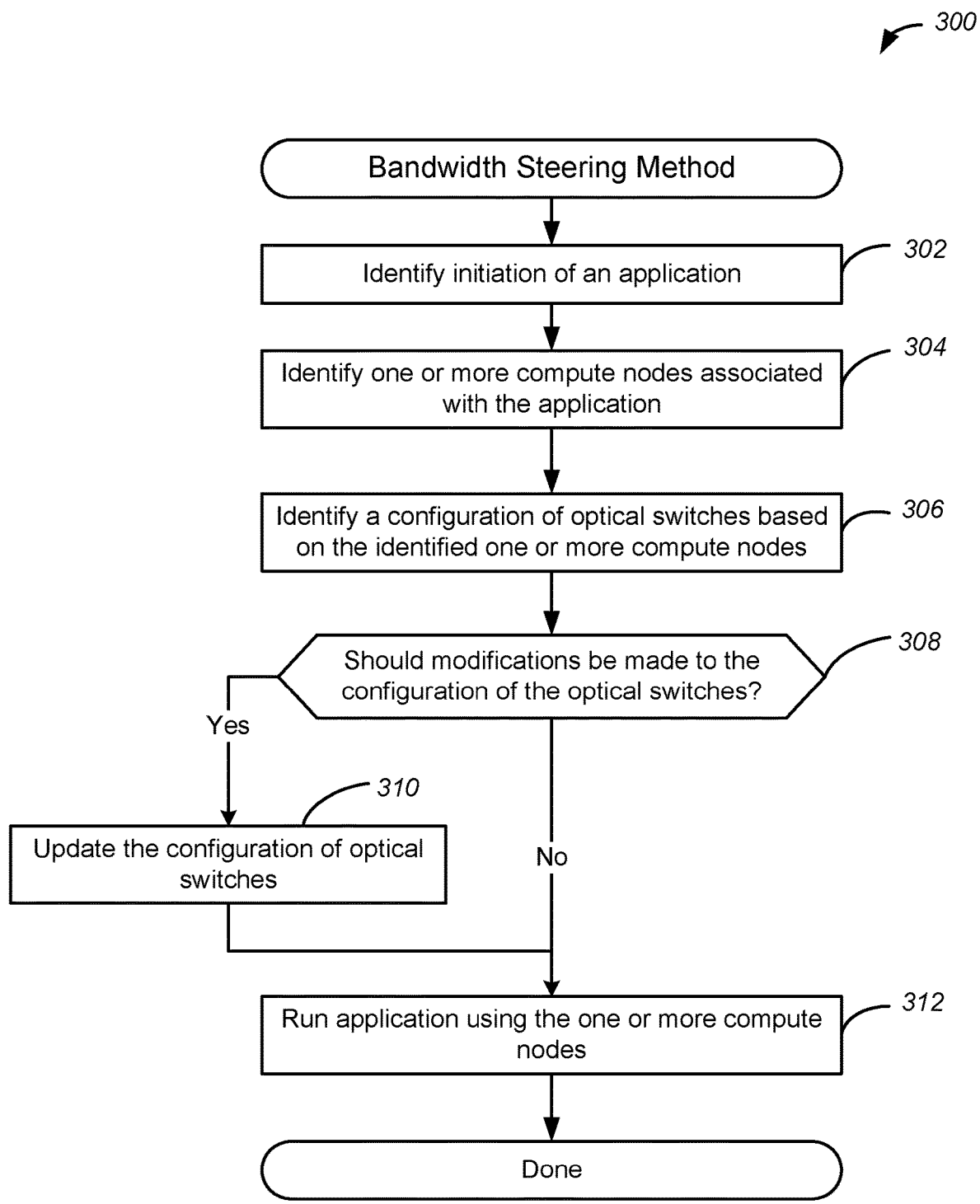
FIG. 3 illustrates a flow chart of another example of a method for bandwidth steering utilizing photonic devices, configured in accordance with some embodiments.

FIG. 3 illustrates a flow chart of another example of a method for bandwidth steering utilizing photonic devices, configured in accordance with some embodiments. In various embodiments, method 300 may commence with operation 302 during which an initiation of an application may be identified. As similarly discussed above, various applications, such as enterprise applications, may be implemented using compute nodes and resources included in a data center.

In various embodiments, one or more trigger events may be identified during operation 302, such as the initiation of an application or an operation implemented by the application. A system component, such as a job scheduler may identify the presence of such a trigger event. For example, the job scheduler may determine if and when an application is starting, and notify the appropriate computing resources that such an event is occurring.

Method 300 may proceed to operation 304 during which one or more compute nodes associated with the application may be identified. Accordingly, a requesting compute node may be identified and a target compute node may be identified. In this way a beginning and an end point within the computing environment may be identified based on the trigger event discussed above with reference to operation 304.

Method 300 may proceed to operation 306 during which a configuration of optical switch circuits may be identified based on the previously identified one or more compute nodes. Accordingly, during operation 306 an initial configuration of optical switch circuits may be implemented, and a network topology may be configured. In various embodiments, the initial configuration of the optical switch circuits may be determined based on predetermined parameters, such as a shortest path. As will be discussed in greater detail below, a shortest path may be determined by a deterministic routing algorithm that always chooses a steered path if one is available because that the steered path is the shortest path.

In some embodiments, the initial configuration may have been previously stored based on previous activity. For example, an application may have previously generated and transmitted an expected traffic pattern that may be represented as a matrix or a graph. More specifically, a particular application accessing and utilizing compute nodes may have generated an expected traffic pattern that identifies an expected utilization of computing resources. Such a traffic pattern may be stored and transmitted as a data object such as a graph or a text file.

In another example, the initial configuration may be determined or inferred using one or more machine learning or deep learning techniques. Accordingly, an observation period may be implemented in which traffic associated with an application is observed. One or more machine learning algorithms may be used to generate a network traffic model configured to predict traffic utilization by the application in future operations. In another example, a neural network is trained based on such an observation period, and the neural network may also be configured to predict traffic utilization by the application in future operations. In various embodiments, the initial configuration is stored in a data storage location.

Method 300 may proceed to operation 308 during which it may be determined if any modifications should be made to the configuration of optical switch circuits. In various embodiments, such a determination may be made based on one or more bandwidth steering parameters. For example, if there are bandwidth steering parameters such as availability of resources and network congestion of such resources that should be considered, it may be determined that changes should be made to the configuration of the network topology to compensate for such parameters. If it is determined that the configuration of optical switch circuits should not be modified, then method 300 may proceed to operation 312. However, if it is determined that the configuration of optical switch circuits should be modified, method 300 may proceed to operation 310.

Accordingly, method 300 may proceed to operation 310 during which the configuration of optical switch circuits may be modified. As discussed, such modifications may be made based on one or more parameters, such as bandwidth steering parameters. For example, it may first be determined if a direct path is available in which an optical switch circuit is used, and no third level resources are utilized. It may also be determined if level resources are overly congested. For example, buffer utilization of resources, such as links and switches, may be surveyed, and overly congested resources may be circumnavigated. In various embodiments, if buffer utilization data is not available, other parameters may be utilized, such as probabilistic estimates or estimates based on previous network traffic. In this way, given an initial configuration, such as a traffic matrix, bandwidth steering parameters may be utilized to reduce the amount of traffic that traverses core layer links, such as those associated with third level resources.

In various embodiments, a designated path may be determined by generating a plurality of possible paths, and ranking each of the possible paths based on one or more bandwidth steering parameters. For example, ingress ports and egress ports of level resources may be labeled with unique identifiers, and a plurality of paths may be generated based the starting compute node and the end compute node. One or more bandwidth steering parameters, such as network congestion, may be evaluated for each possible path, and the possible paths may be ranked. A best available path may be selected as a designated path and the optical switch circuits included in the designated path may be configured to implement the designated path.

In some embodiments, one or more components are configured to iteratively solve for the configuration of each optical circuit switch as a maximum weight matching problem, with the matching weights being proportional to the amount of unsatisfied traffic flows. Accordingly, each optical circuit switch can be modeled as a bipartite graph with weighted edges, $G_o$. In some embodiments, $G_o$ may be determined by first generating a dummy source and sink node, and two sets of nodes, such as left-sided and right-sided nodes, L and R respectively. Then, for each optical circuit switch ingress port, a node labelled with the source's pod ID may be created and assigned to L. Next, for each optical circuit switch egress port, a node labelled with the destination's pod ID may be created and assigned to R. Then, the dummy source node may be connected to all nodes in L with unit capacity, and all nodes in R may be connected to the dummy sink node with unit capacity. Next, all the nodes in L and R with unit capacity may be connected. In various embodiments, an implementation of an Edmond-Karp's algorithm may be used to solve each maximum-weight matching sub-problem. Accordingly, each bipartite matching can be solved in $O(r^4)$. Thus, the overall implantation may have a runtime complexity of $O(kr^4)$.

In this way, a designated path may be determined based on the identified start and end point as well as the bandwidth steering parameters, and the appropriate optical switch circuits may be configured to implement the designated path. In various embodiments, the configuration and implementation of the designated path occurs quickly, and in a manner of a few microseconds. In some embodiments, such bandwidth steering parameters may be determined upon termination of execution of an application.

Method 300 may proceed to operation 312 during which the request associated with the application may be implemented using the identified configuration of optical switch circuits. Accordingly, as will be discussed in greater detail below, a data packet may be transmitted from the starting compute node to the target compute node via the identified network topology path that has been configured based on the initial configuration of the optical switch circuits.

Figure 4:
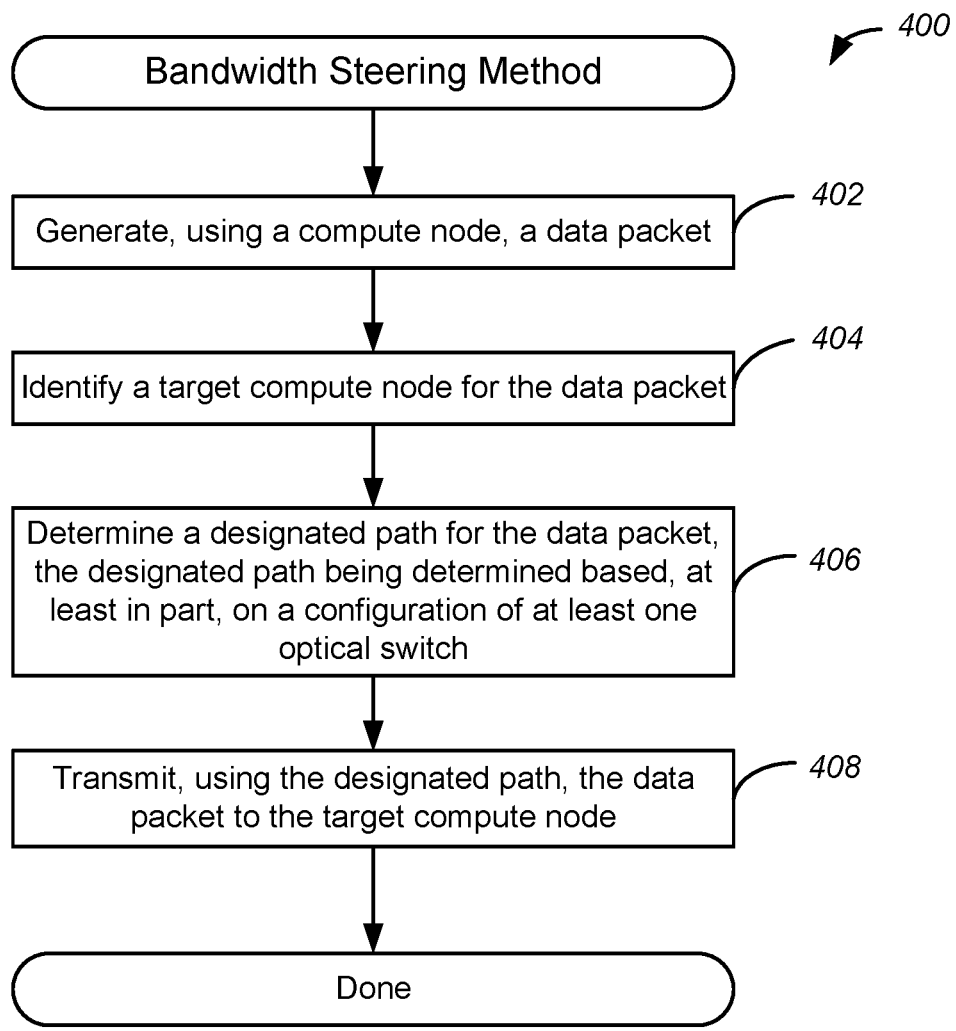
FIG. 4 illustrates a flow chart of yet another example of a method for bandwidth steering utilizing photonic devices, configured in accordance with some embodiments.

FIG. 4 illustrates a flow chart of yet another example of a method for bandwidth steering utilizing photonic devices, configured in accordance with some embodiments. Accordingly, method 400 may commence with operation 402 during which a data packet may be generated. As similarly discussed above, a data packet may be generated by a compute node and in response to an operation associated with an application that is implemented using the compute node.

Method 400 may proceed to operation 404 during which a target compute node may be identified for the data packet. In various embodiments, the target compute node may be identified based on the operation implemented by the application, and a requested computing resource associated with the operation. Accordingly, a system component, such as a job scheduler may identify the target compute node based on the application request, and may thus determine a start and end point for the data packet transmission.

Method 400 may proceed to operation 406 during which a designated path may be determined for the data packet. In various embodiments, the designated path is determined as previously discussed above. Accordingly, the designated path may have been previously determined based on the above-described bandwidth steering parameters, and may have been stored in a data storage location. Accordingly, during operation 406, a previous stored designated path identifying a specific network topology may be retrieved and implemented. In various embodiments, if no previous designated path is available, one may be generated during operation 406.

Method 400 may proceed to operation 408 during which the data packet is transmitted to the target compute node using the designated path. Accordingly, the data packet may be transmitted from the compute node up to a first level resource, then up to the identified optical switch circuit, then down to another first level resource, and then down to the target compute node.

FIG. 5 illustrates an example of a computing device configured in accordance with some embodiments. According to particular example embodiments, system 500 may be suitable for implementing various components described above, such as controller 130 as well as the compute nodes. In various embodiments, system 500 may include processor 501 which may be configured to implement one or more processing operations. For example, processor 501 may be configured to implement bandwidth steering computations, as discussed above. System 500 may also include bus 515 which may be configured to enable communication between various components of system 500.

In various embodiments, system 500 may further include memory 520 which may be configured to store data objects and data values discussed above. For example, bandwidth steering parameters and initial configuration data, as well as updated configuration data may be stored in memory 520. In some embodiments, one or more components of processor 501 and memory 520 may be implemented in an application specific integrated circuit (ASIC), or may be implemented in reprogrammable logic of a field programmable gate array. In some embodiments, control circuitry 128 may be implemented in a programmable system or controller that further includes a non-volatile memory.

In various embodiments, communications interface 511 may be configured to send and receive data to other system components, or may be configured to send and receive packets or data segments over a network. For example, communications interface 511 may be communicatively coupled to a user interface device via a bus, such as bus 515, or via a communications network. As discussed above, communications interface 511 may be configured to receive data from such a user interface device which may be included in a data processing system or computer system. In various embodiments, such data may include an input identifying bandwidth steering parameters from a user. In various embodiments, communications interface 511 may be a device that supports Ethernet interfaces, frame relay interfaces, cable interfaces, and DSL interfaces. In addition, various very high-speed interfaces may be provided such as fast Ethernet interfaces, Gigabit Ethernet interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A system comprising:
a plurality of compute nodes configured to execute one or more applications;
a plurality of first level resources communicatively coupled to the plurality of compute nodes;
a plurality of second level resources communicatively coupled to the plurality of first level resources;
a plurality of third level resources communicatively coupled to the plurality of second level resources; and
a plurality of optical switch circuits communicatively coupled to the plurality of first level resources and the plurality of second level resources, wherein each of the plurality of optical switch circuits is coupled to more than one of the plurality of the first level resources and is also coupled to more than one of the plurality of the second level resources.

2. The system of claim 1, wherein the plurality of first level resources comprises a plurality of Top of Rack (ToR) switches, wherein the plurality of second level resources comprises a plurality of aggregation switches, and wherein the plurality of third level resources comprises a plurality of core switches.

3. The system of claim 2, wherein the plurality of ToR switches and the plurality of aggregation switches is arranged in a plurality of pods.

4. The system of claim 3, wherein each of the plurality of pods includes one of the plurality of optical switch circuits.

5. The system of claim 4, wherein each of the plurality of optical switch circuits is communicatively coupled to one of the plurality of first level resources included in each pod, and wherein each of the plurality of optical switch circuits is communicatively coupled to one of the plurality of second level resources included in each pod.

6. The system of claim 1, wherein the plurality of optical switch circuits are configurable to implement a designated path based on a specified network topology.

7. The system of claim 6, wherein the specified network topology does not include any of the plurality of third level resources.

8. The system of claim 6, wherein the designated path is determined based, at least in part, on network traffic congestion.

9. The system of claim 1, wherein the plurality of compute nodes, the plurality of first level resources, the plurality of second level resources, the plurality of third level resources, and the plurality of optical switch circuits are included in a data center.

10. A method comprising:
identifying a network traffic event;
identifying a designated path associated with a specified network topology based, at least in part, on one or more compute nodes associated with the network traffic event; and
configuring at least one optical switch circuit based, at least in part, on the identified network topology, wherein the network topology comprises:
a plurality of first level resources communicatively coupled to the plurality of compute nodes;
a plurality of second level resources communicatively coupled to the plurality of first level resources; and
a plurality of third level resources communicatively coupled to the plurality of second level resources.

11. The method of claim 10, wherein the plurality of first level resources comprises a plurality of Top of Rack (ToR) switches, wherein the plurality of second level resources comprises a plurality of aggregation switches, wherein the plurality of third level resources comprises a plurality of core switches, wherein the plurality of ToR switches and the plurality of aggregation switches is arranged in a plurality of pods, and wherein each of the plurality of pods includes one of a plurality of optical switch circuits.

12. The method of claim 11, wherein each of the plurality of optical switch circuits is communicatively coupled to one of the plurality of first level resources included in each pod, and wherein each of the plurality of optical switch circuits is communicatively coupled to one of the plurality of second level resources included in each pod.

13. The method of claim 12, wherein the specified network topology does not include any of the plurality of third level resources.

14. The method of claim 13, wherein the plurality of compute nodes, the plurality of first level resources, the plurality of second level resources, the plurality of third level resources, and the plurality of optical switch circuits are included in a data center.

15. The method of claim 12, wherein the designated path is identified based, at least in part, buffer utilization of at least some of the plurality of first level resources, the plurality of second level resources, and the plurality of third level resources.

16. A device comprising:
an optical switch circuit;
a first communications interface communicatively coupled to the optical switch circuit and a plurality of first level resources; and
a second communications interface communicatively coupled to the optical switch circuit and a plurality of second level resources, wherein the plurality of first level resources is communicatively coupled to a plurality of compute nodes, wherein the plurality of second level resources is communicatively coupled to the plurality of first level resources and a plurality of third level resources.

17. The device of claim 16, wherein the plurality of first level resources comprises a plurality of Top of Rack (ToR) switches, wherein the plurality of second level resources comprises a plurality of aggregation switches, wherein the plurality of third level resources comprises a plurality of core switches.

18. The device of claim 17, wherein the plurality of ToR switches and the plurality of aggregation switches is arranged in a plurality of pods, wherein the optical switch circuit is communicatively coupled to one of the plurality of first level resources included in each pod, and wherein the optical switch circuit is 10 communicatively coupled to one of the plurality of second level resources included in each pod, and wherein the optical switch circuit is configurable to implement a designated path based on a specified network topology.

* * * * *